(12) United States Patent
Lee et al.

(10) Patent No.: US 12,337,510 B2
(45) Date of Patent: Jun. 24, 2025

(54) APPARATUS FOR REMOVING AND PACKAGING ELASTOMERIC ARTICLES

(71) Applicant: SKY-TAG ROBOTICS SDN. BHD., Simpang Ampat (MY)

(72) Inventors: Yong Kheng Lee, Simpang Ampat (MY); Yan Siong Tan, Simpang Ampat (MY)

(73) Assignee: SKY-TAG ROBOTICS SDN. BHD., Simpang Ampat (MY)

( * ) Notice: Subject to any disclaimer, the term of this patent is extended or adjusted under 35 U.S.C. 154(b) by 57 days.

(21) Appl. No.: 18/031,437

(22) PCT Filed: Sep. 30, 2021

(86) PCT No.: PCT/MY2021/050081
§ 371 (c)(1),
(2) Date: Apr. 12, 2023

(87) PCT Pub. No.: WO2022/093006
PCT Pub. Date: May 5, 2022

(65) Prior Publication Data
US 2023/0373135 A1 Nov. 23, 2023

(30) Foreign Application Priority Data

Oct. 30, 2020 (MY) .......................... PI 2020005683

(51) Int. Cl.
*B29C 41/42* (2006.01)
*B29C 37/00* (2006.01)
(Continued)

(52) U.S. Cl.
CPC .......... *B29C 41/42* (2013.01); *B29C 37/0017* (2013.01); *B65B 25/20* (2013.01); *B65B 35/50* (2013.01); *B29L 2031/4864* (2013.01)

(58) Field of Classification Search
CPC ..... B29C 37/0017; B29C 41/42; B65B 25/20; B65B 35/50; B65B 25/141; B29L 2031/4864
See application file for complete search history.

(56) References Cited

U.S. PATENT DOCUMENTS 3,176,059 A * 3/1965 Cremer ............... B29C 37/0017
425/437
3,309,732 A * 3/1967 Cremer ............... B29C 37/0017
425/274
(Continued)

FOREIGN PATENT DOCUMENTS

CN 102633022 8/2012
CN 202412559 9/2012
(Continued)

OTHER PUBLICATIONS

International Search Report Dated Feb. 10, 2022.
(Continued)

*Primary Examiner* — Andrew M Tecco
*Assistant Examiner* — Nicholas E Igbokwe
(74) *Attorney, Agent, or Firm* — Preston Smirman; SMIRMAN IP LAW, PLLC (57) ABSTRACT

The present invention discloses an apparatus (100) for removing and packaging elastomeric articles (80), the apparatus comprising a stripping means for removing said articles (80) from their former to a moveable receptacle (30), the moveable receptacle (30) having a bottom surface which opens up to unload the articles (80) into a layering conveyor (40), wherein the layering conveyor (40) is provided with side barriers (41) for aligning and stacking of the articles (80) to be collected by an end effector (50) thereafter.

5 Claims, 6 Drawing Sheets

(51) Int. Cl.
  *B65B 25/20* (2006.01)
  *B65B 35/50* (2006.01)
  *B29L 31/48* (2006.01)

(56) References Cited

U.S. PATENT DOCUMENTS

| | | | |
|---|---|---|---|
| 5,127,209 A * | 7/1992 | Hunter | B65H 33/16 |
| | | | 53/529 |
| 5,664,407 A | 9/1997 | Cooper et al. | |
| 5,776,520 A * | 7/1998 | Howe | B29C 41/42 |
| | | | 425/274 |
| 10,239,646 B2 | 3/2019 | Cao | |
| 11,213,978 B2 * | 1/2022 | Stollery | B29C 37/0017 |
| 2012/0257951 A1 * | 10/2012 | Arnone | B65G 47/1485 |
| | | | 414/808 |
| 2018/0244415 A1 * | 8/2018 | Cao | B65B 35/56 |
| 2019/0002148 A1 * | 1/2019 | Stollery | B65B 25/20 |

FOREIGN PATENT DOCUMENTS

| | | | | |
|---|---|---|---|---|
| CN | 203888112 | | 10/2014 | |
| CN | 209008980 | | 6/2019 | |
| CN | 209008980 U | * | 6/2019 | ............ B65B 35/50 |
| WO | 2014037701 | | 3/2014 | |

OTHER PUBLICATIONS

Written Opinion of International Searching Authority Dated Feb. 10, 2022.
Written International Preliminary Report On Patentability Dated Mar. 8, 2023.
English Abstract of CN 209008980.
English Abstract of CN 203888112.
English Abstract of CN 202412559.
English Abstract of CN 102633022.

* cited by examiner

APPARATUS FOR REMOVING AND PACKAGING ELASTOMERIC ARTICLES

CROSS-REFERENCE TO RELATED APPLICATION

The instant application is a national phase of PCT International Application No. PCT/MY2021/050081 filed Sep. 30, 2021, and claims priority to Malaysian Patent Application Serial No. PI 2020005683 filed Oct. 30, 2020, the entire specifications of both of which are expressly incorporated herein by reference.

FIELD OF INVENTION

The present invention relates to an apparatus for removing and packaging elastomeric articles, more particularly in a glove manufacturing line.

BACKGROUND OF THE INVENTION

A glove manufacturing line will normally have at least one pair of chain conveyor which transports glove formers through various production steps, which includes a step of stripping cured gloves inside out from the glove formers. Stripping gloves normally involves manual labour, at least in part of the stripping process, but advancements in technology has allowed automation to take over. However, labour is still required to handle the gloves after they have been removed from the stripping station for packing into boxes or dispensers.

Many technologies related to glove stripping and packaging have been proposed to improve the apparatus. For example, a Chinese granted utility model with publication no. CN202412559U discloses a roller for a glove counting machine, whereby a fan-shaped notch is arranged on the circumference of the section of the roller. The roller is disposed in between a conveyor with pre-stripped gloves and a conveyor for receiving said gloves. As the glove enters the fan-shaped notch, two rollers roll towards each other and clamp the glove, pulling it off its former and releasing it to be received by the conveyor underneath the roller. An international patent application with publication no. WO2014122595A1 discloses an apparatus and method for handling of flexible products produced in a dip moulding process, particularly of products such as gloves. The apparatus comprises a first conveyor, a second conveyor and a carriage. The first conveyor having a first transporting surface, the second conveyor having a second transporting surface, with said transporting surfaces facing each other in juxtaposition with a first opening therebetween. The apparatus receives the gloves in the first and second transporting surfaces, the gloves are then oriented for a first time then transported to one end to be re-oriented and ejected to be stacked and packaged thereafter. Another technology as disclosed in a Chinese patent application with publication no. CN102633022A relates to a counting machine which comprises a rack, wherein the rack is provided with at least one group of fetching mechanisms. Each fetching mechanism comprises two mutually parallel rotary shafts arranged in the rack with each rotary shaft respectively connected with a rotary driving device arranged on the rack. The driving device drives the two rotary shafts to rotate inwards in opposite directions for pulling pre-stripped gloves from a conveyor above the rack. Further, a platform with a conveying belt is arranged below the fetching mechanism to receive the pulled gloves. The rack is also further provided with a vertical movement driving device which can drive the platform to move up and down. Besides that, a U.S. Pat. No. 10,239,646B2 discloses a glove picking, organizing and stacking apparatus comprising a glove-picking apparatus, a correcting conveying apparatus, a conveying and placing apparatus, and a front/back stacking, conveying and taking apparatus. A system control apparatus is connected to the described apparatuses and controls their switching and operation, thereby automatically carrying out the entire process of picking, transporting, stacking, and counting the gloves.

The aforementioned patent documents describe the many apparatus for glove stripping and packaging, which are key components in the proposed invention. A major drawback arises therefrom as the apparatus lack a means for stacking the gloves to a predetermined stack before being transported off by an end effector to be packaged. There exists a need for an apparatus of such configuration to increase efficiency in the production line and reduce the intensity of manual labour for glove manufacturing.

SUMMARY OF INVENTION

It is an object of the present invention to provide a more convenient glove stripping, and packaging apparatus, which may automatically complete the process of stripping, conveying, stacking, counting and packaging the gloves with high quality and high efficiency.

The present invention discloses an apparatus for removing and packaging elastomeric articles, the apparatus comprising a stripping means for removing said articles from their former to a moveable receptacle, the moveable receptacle having a bottom surface which opens up to unload the articles into a layering conveyor, wherein the layering conveyor is provided with side barriers for aligning and stacking of the articles to be collected by an end effector thereafter.

Preferably, the stripping means comprises at least two semi-cylindrical rollers.

Preferably, the rollers are partially covered with an abrasive material on its surface.

Preferably, the moveable receptacle receives one article at a time before releasing said article into the layering conveyor.

Preferably, the moveable receptacle is moveable by a linear motion motor.

Preferably, the layering conveyor moves a stack of the articles upon reaching a predetermined number of articles.

Preferably, the side barriers have shapes complementary to claws of the end effector.

Preferably, the apparatus further comprising sensors for detecting presence of the articles upon reaching the roller.

Preferably, the sensors trigger the rollers to rotate and the moveable receptacle to move towards or away from a position below the rollers.

Preferably, the apparatus further comprising an inclined guide for guiding the removed articles to the moveable receptacle.

One skilled in the art will readily appreciate that the present invention is well adapted to carry out the objects and obtain the ends and advantages mentioned, as well as those inherent therein. The embodiment described herein is not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

Hereinafter, the invention shall be described according to the preferred embodiments of the present invention and by referring to the accompanying description and drawings. However, it is to be understood that limiting the description to the preferred embodiments of the invention is merely to facilitate discussion of the present invention and it is envisioned that those skilled in the art may devise various modifications without departing from the scope of the appended claim.

The invention will now be described in greater detail, by way of example with reference to the drawings.

Figure 1:
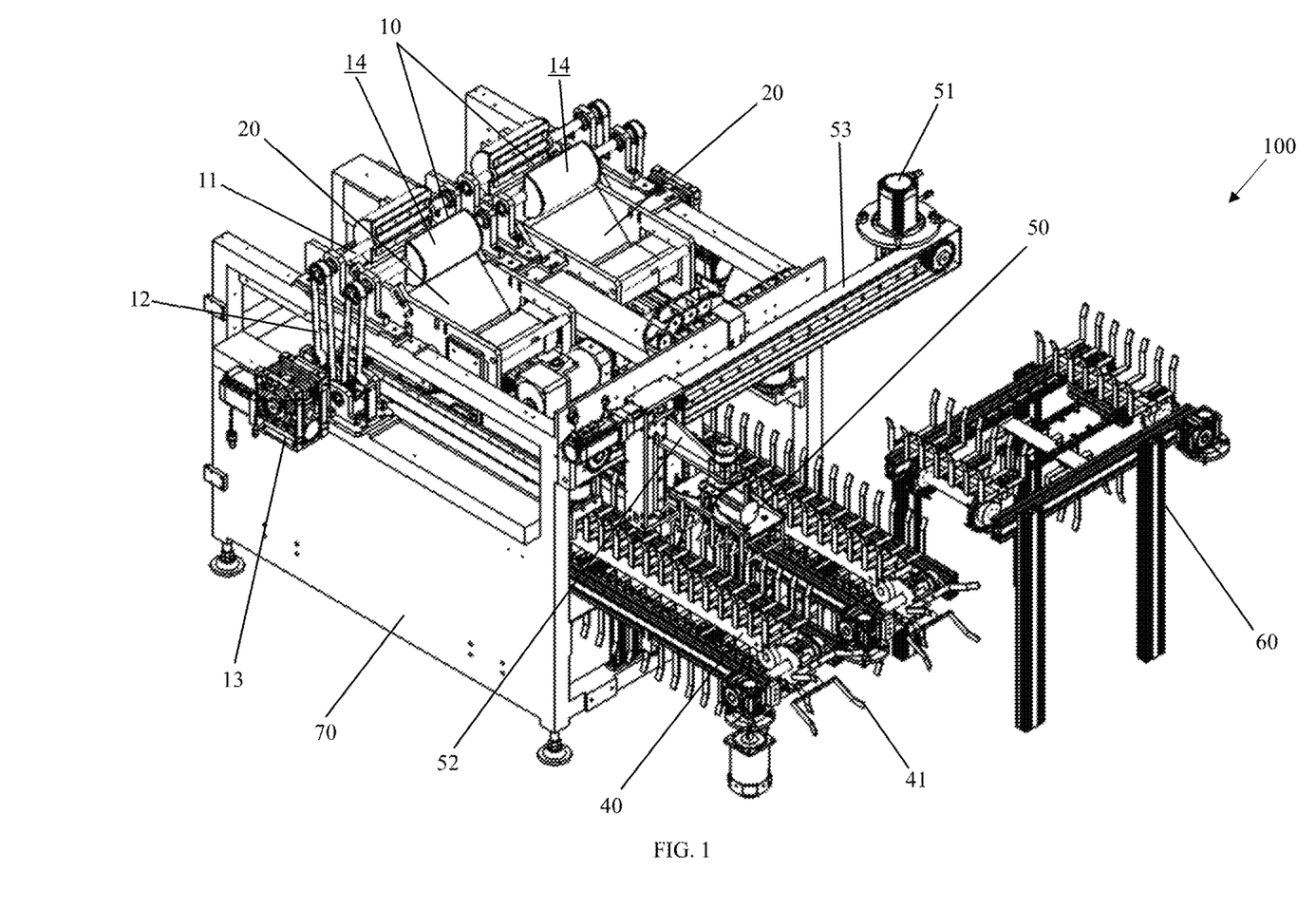
FIG. 1 is a perspective view illustrating an apparatus for removing and packaging elastomeric articles.

FIG. 1 illustrates a preferred embodiment of an apparatus 100 for removing and packaging elastomeric articles 80, preferably installed at a stripping section of a production line. In a preferred embodiment, the apparatus 100 comprises a frame 70 for attaching at least one pair of stripping means for removing said articles 80, preferably gloves such as, by way of example but not limited to, nitrile gloves, latex gloves and the likes. Preferably, the stripping means comprises at least two semi-cylindrical rollers 10 held in place by shafts 11 disposed therealong the centre of each roller 10, in which the shafts 11 may be connected at one end to a motor 13 via belts 12, wherein the rotation of the motors 13 causes the shafts 11 rotate the rollers 10. The motors 13 are also attached to an upper portion on the sides of the frame 70. Further, the rollers 10 may be partially covered with an abrasive material on a curved surface of the rollers 10 for enhancing gripping on the articles 80 to be removed. The rollers 10 are triggered by external sensors mounted above former chain conveyors to detect incoming formers upon which the articles 80 are dangling from. Upon detection of the articles 80, the external sensors may trigger the rollers 10 to rotate 360°, whereby the surface of the rollers 10 covered with the abrasive material will grip onto the dangling articles 80 and pull them down from their formers.

Figure 2:
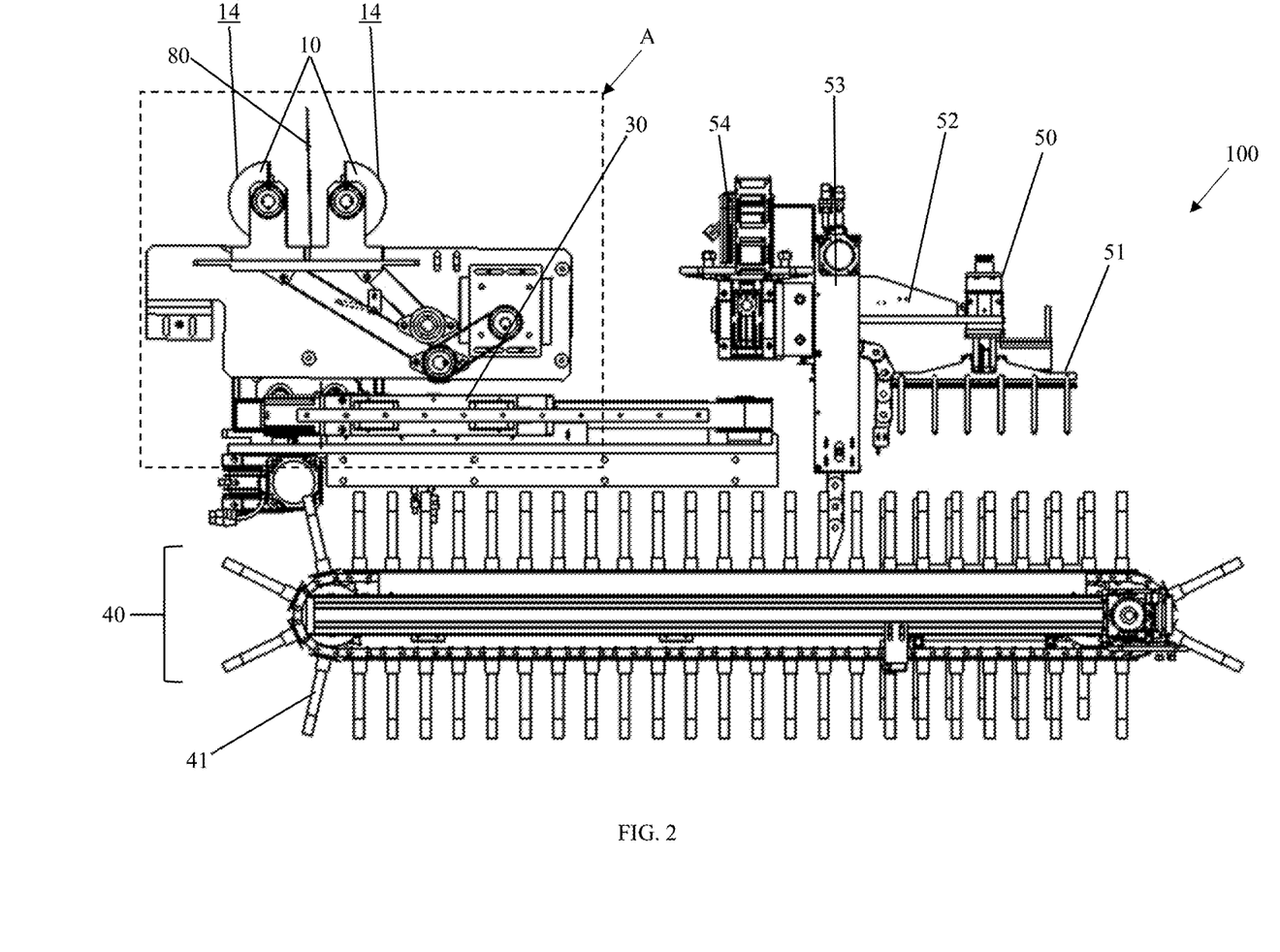
FIG. 2 is a side view of the apparatus for removing and packaging elastomeric articles.
Figure 3:
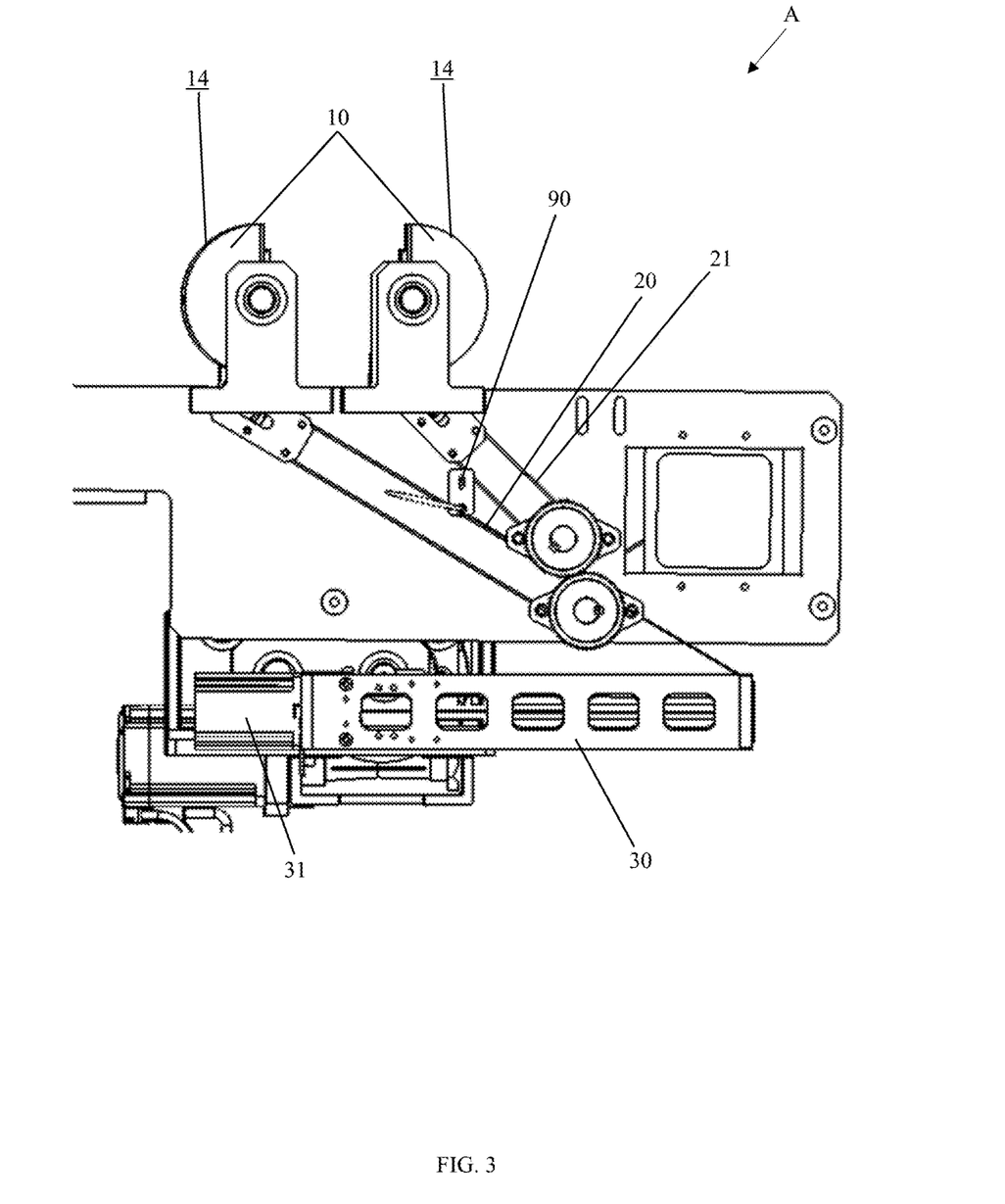
FIG. 3 is a side view illustrating an enlarged section A.
Figure 4A:
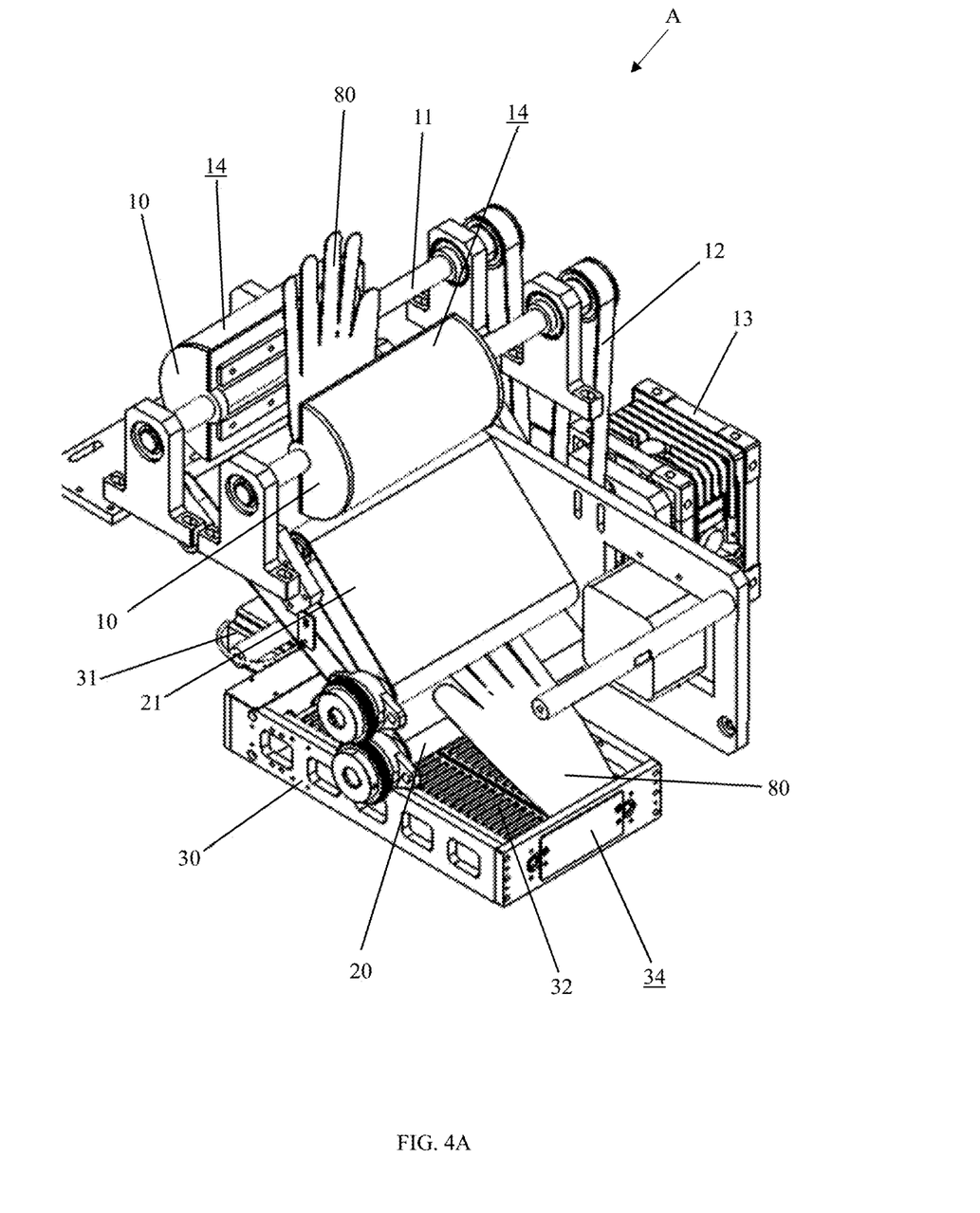
FIG. 4A illustrates an exemplary embodiment of the elastomeric article being transported to a moveable receptacle.
Figure 4B:
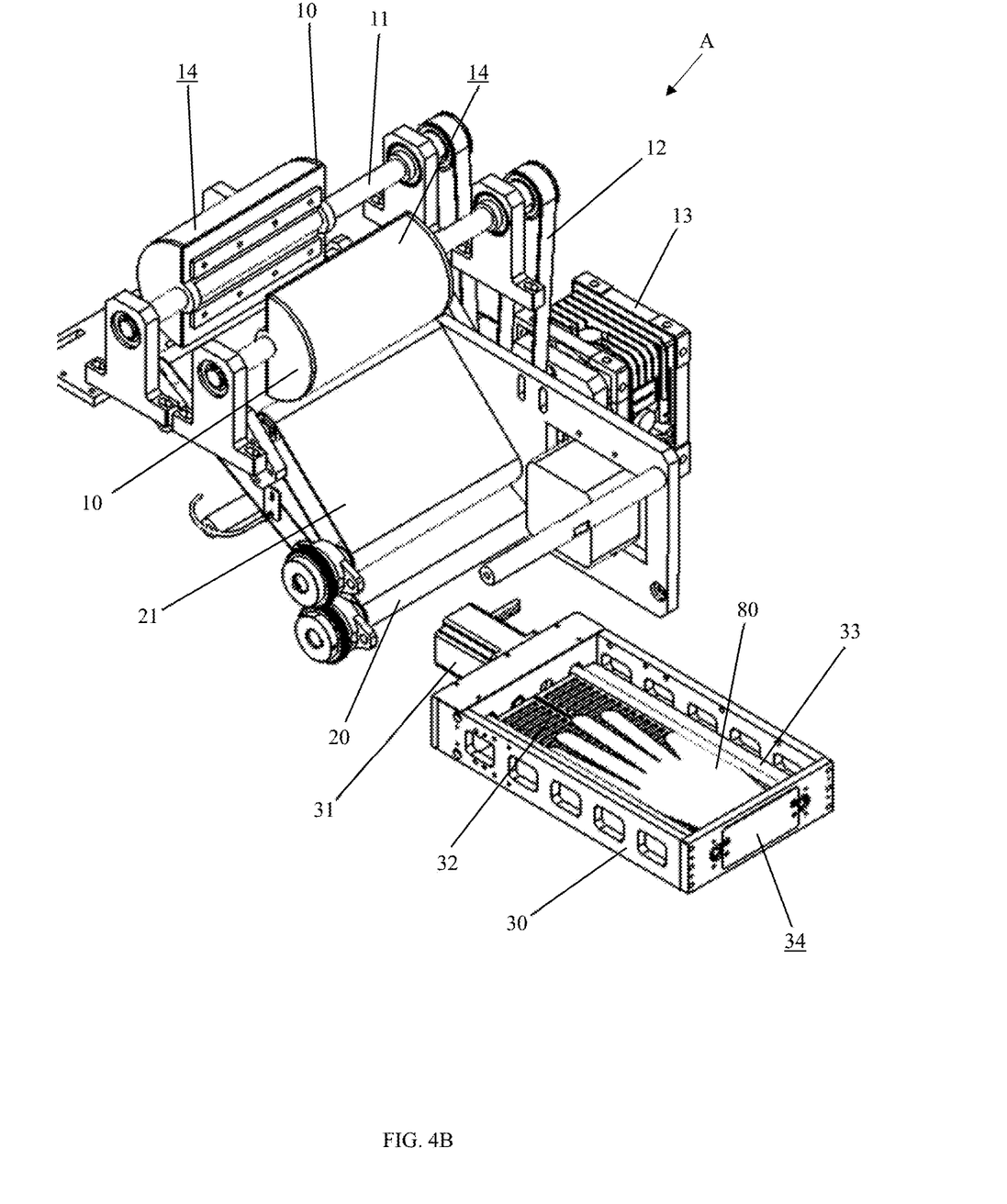
FIG. 4B illustrates an exemplary embodiment of the moveable receptacle transporting the elastomeric article.

In a particular embodiment, an inclined guide 20 is disposed beneath the rollers 10 for guiding the articles to a moveable receptacle 30 below said guide 20, such as illustrated in FIG. 2, FIG. 3 and FIG. 4. The inclined guide 20 may be a belt conveyor with a belt extended in an endless loop between two end-pulleys and may operate at a predetermined speed to allow transfer of the articles 80 to the moveable receptacle 30 at a manageable pace. Another belt conveyor 21 is disposed above the inclined guide 20 at a steeper angle, to facilitate the alignment of the articles 80 as they are guided through the incline guide 20 and ensure the article 20 is laid flat as shown in FIG. 4A. The sensor 90 for detecting the presence of the dangling articles 80 is disposed behind the inclined guide 20 also functions to detect the presence of the articles 80 being moved along the inclined guide 20, subsequently triggering the moveable receptacle 30 to move longitudinally from its resting position towards the bottom of the inclined guide 20 to receive the articles 80. The moveable receptacle 30 will then move to a predetermined location away from the inclined guide 20 as illustrated in FIG. 4B upon receiving the article 80.

Figure 4C:
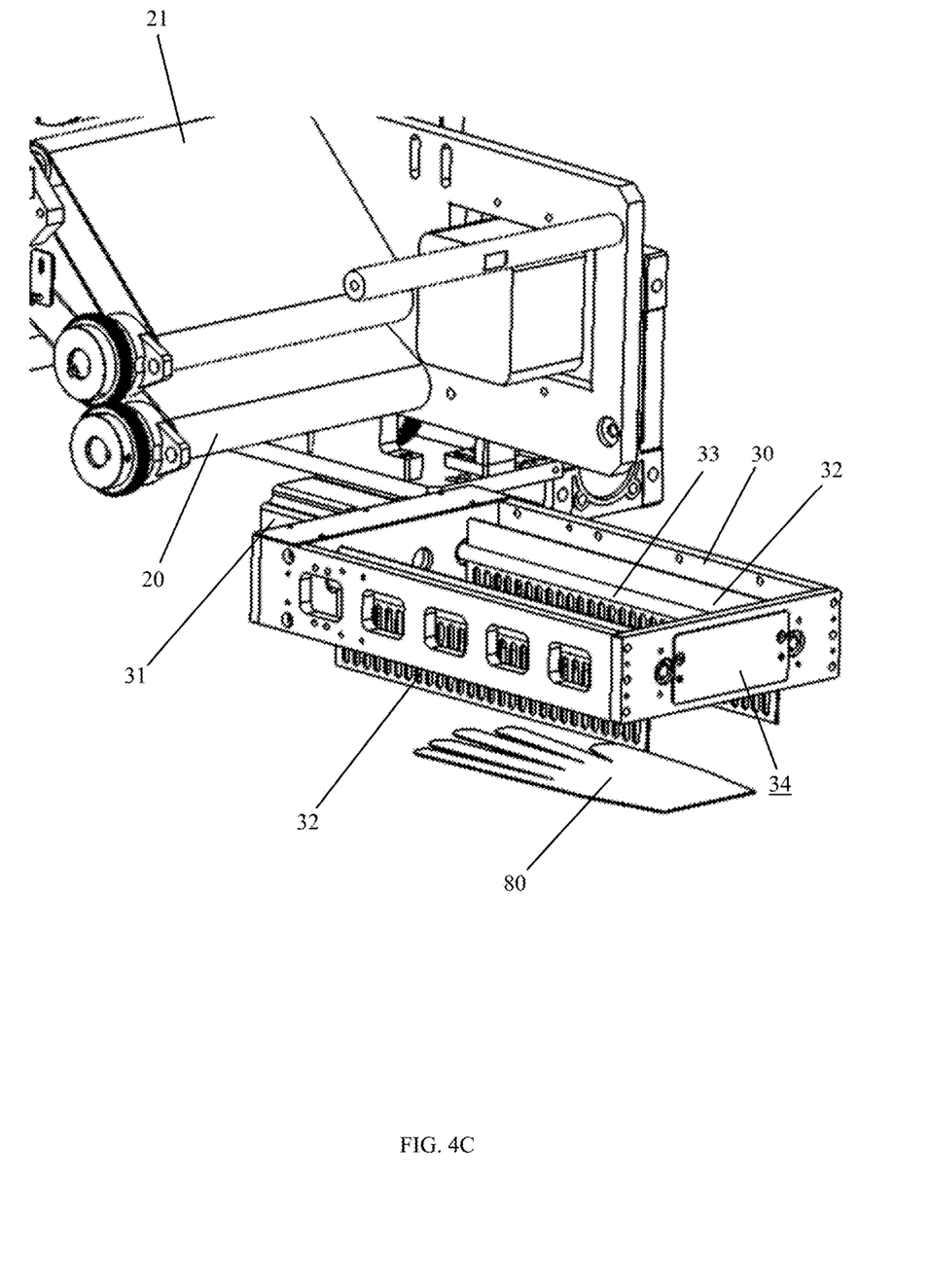
FIG. 4C illustrates an exemplary embodiment of the elastomeric article being unloaded from the moveable receptacle.

In a preferred embodiment, the moveable receptacle 30 is provided with an opening and closing mechanism at its bottom surface, the mechanism comprising of a pair of plates 32 with shafts 33 connected to two ends of the receptacle 30 walls, in which the shafts 33 may be connected to a motor 31 using a gear system for controlling the rotation of the plates 32 to alternate between a closed configuration and an opened configuration. Preferably, the plates 32 rotate no more than 90° to the opened configuration and likewise back to the closed configuration. In a further embodiment, another sensor may be disposed in the moveable receptacle 30 to detect the presence of the received article 80 which then triggers the plates 32 to rotate to the opened configuration. Preferably, the moveable receptacle 30 receives one article at a time.

In another preferred embodiment, the apparatus 100 further comprises at least one layering conveyor 40 for receiving unloaded articles 80 from the moveable receptacle 30. The layering conveyor 40 is similar to a slat conveyor or apron conveyor whereby slats are discretely spaced and connected to a low friction roller chain for conveyance. Attached to each slat on the layering conveyor 40 is a typically U-shaped strip, preferably made of plastic, forming side barriers 41 on the layering conveyor 40. Tips of the strips may be slightly bent outwards to facilitate the aligning of the articles 80 as they are unloaded from the moveable receptacle 30. The articles 80 are subsequently stacked one on top of another within the side barriers 41 for a predetermined amount, preferably in a stack of ten articles 80, before the layering conveyor 40 conveys the stack away from the position below the moveable receptacle 30, wherein the stack of articles 80 will then be collected to be packaged thereafter.

In a particular embodiment, the apparatus 100 further comprises an end effector 50 for collecting the stack of articles 80 from the layering conveyor 40, such as illustrated in FIG. 2. The end effector 50 comprises a claw 51 attached to an arm 52, in which the arm 52 is fixed to a bracket on a track 53 which is able to move laterally from the layering conveyor 40 to a packaging conveyor 60. The movement of the end effector 50 is further facilitated by a motor and roller chain system 54, whereby the end effector 50 is programmed to move from the layering conveyor 40 to the packaging conveyor 60 at a predetermined speed. Preferably, the end effector 50 may also be programmed to collect the stack of articles 80 from either one layering conveyor 40 on the apparatus 100 when the stack reaches a predetermined location on the layering conveyor 40. The space between the strips of the side barriers 41 complement the claw 51 of the end effector 50, allowing the claw 51 to clamp onto the stack of articles 80 without obstruction. Further, the end effector 50 then transfer the stack of articles 80 to the packaging conveyor 60 to be packaged thereafter.

The present disclosure includes as contained in the appended claims, as well as that of the foregoing description. Although this invention has been described in its preferred form with a degree of particularly, it is understood that the present disclosure of the preferred form has been made only by way of example and that numerous changes in the details of construction and the combination and arrangements of parts may be resorted to without departing from the scope of the invention.

The invention claimed is:

1. An apparatus for removing and packaging elastomeric articles, comprising:
   a stripping unit for removing each article from incoming formers along a production line upon which the article is dangling from;
   an inclined guide for guiding the removed article;
   a moveable receptacle for receiving the article from the inclined guide having a bottom surface which opens up to unload the articles;
   a layering conveyor for receiving the article from the moveable receptacle, being provided with side barriers for aligning and stacking of the articles to be collected by an end effector thereafter;
   wherein the inclined guide is incorporated with an external sensor for detecting presence of the dangling article for triggering the stripping unit, and a sensor for detecting presence of the article being moved along the inclined guide such that the moveable receptacle, driven by a motor, is triggered to move towards the inclined guide to receive the article, and the moveable receptacle is included with another sensor to detect presence of the received article from the inclined guide, such that the moveable receptacle moves away from the inclined guide upon receiving one article at one time, prior to releasing said article into the layering conveyor upon detection by the another sensor.

2. The apparatus according to claim 1, wherein the stripping unit comprises at least two semi-cylindrical rollers.

3. The apparatus according to claim 2, wherein the rollers are fitted with an abrasive material on its surface.

4. The apparatus according to claim 1, wherein the layering conveyor moves a stack of articles upon reaching a predetermined number of articles.

5. The apparatus according to claim 1, wherein the side barriers have shapes complementary to claws of the end effector.

* * * * *